(12) United States Patent
Kim et al.

(10) Patent No.: US 10,841,272 B2
(45) Date of Patent: Nov. 17, 2020

(54) ADDRESS GENERATING DEVICE OF REMOTE SMART METER READING SYSTEM, AND METHOD THEREFOR

(71) Applicant: KOREA ELECTRIC POWER CORPORATION, Jeollanam-do (KR)

(72) Inventors: Young-Hyun Kim, Daejeon (KR); Myong-Soo Kim, Daejeon (KR); Young-Sung Lee, Daejeon (KR); Geum-Young Jung, Daejeon (KR); Kyung-Seob Lee, Jeollanam-do (KR); Jin-Hee Kim, Jeollanam-do (KR)

(73) Assignee: Korea Electric Power Corporation, Jeollanam-Do (KR)

( * ) Notice: Subject to any disclaimer, the term of this patent is extended or adjusted under 35 U.S.C. 154(b) by 317 days.

(21) Appl. No.: 15/578,965

(22) PCT Filed: Sep. 25, 2015

(86) PCT No.: PCT/KR2015/010256
§ 371 (c)(1),
(2) Date: Dec. 1, 2017

(87) PCT Pub. No.: WO2016/195175
PCT Pub. Date: Dec. 8, 2016

(65) Prior Publication Data
US 2018/0139172 A1  May 17, 2018

(30) Foreign Application Priority Data
Jun. 3, 2015 (KR) .......................... 10-2015-0078412

(51) Int. Cl.
*H04L 29/12* (2006.01)
*H04L 29/08* (2006.01)

(52) U.S. Cl.
CPC ...... *H04L 61/2007* (2013.01); *H04L 61/2038* (2013.01); *H04L 61/2092* (2013.01);
(Continued)

(58) Field of Classification Search
CPC ............. H04L 61/2007; H04L 61/2038; H04L 61/2092; H04L 61/6004; H04L 67/025;
(Continued)

(56) References Cited

U.S. PATENT DOCUMENTS

2011/0307589 A1* 12/2011 Reiss ................ H04L 29/12028
709/223
2013/0332529 A1* 12/2013 Orehawa ............... H04L 65/403
709/204
(Continued)

FOREIGN PATENT DOCUMENTS

| JP | 2004-221734 A | 8/2004 |
|---|---|---|
| JP | 2006-319773 A | 11/2006 |

(Continued)

OTHER PUBLICATIONS

International Search Report issued in corresponding Korean Patent Application No. PCT/KR2015/010256, dated Feb. 23, 2016.

*Primary Examiner* — Joseph L Greene
(74) *Attorney, Agent, or Firm* — Morgan, Lewis & Bockius LLP

(57) ABSTRACT

The present invention relates to an address generating device of a remote smart meter reading system, and a method therefor, the device including: a first MAC address generation unit expressing, in four bits, respective numbers of a meter ID of a watt-hour meter, and then converting the numbers into hexadecimal numbers so as to generate a first MAC address of 48 bits; a second MAC address generation unit generating a second MAC address of 64 bits by adding bits to the first MAC address; a first IP address generation
(Continued)

unit expressing, in four bits, the respective numbers, and then converting the numbers into the hexadecimal numbers and adding bits thereto so as to generate a first IP address of 64 bits being used as an interface ID of IPv6; and a second IP address generation unit generating a second IP address using the second MAC address as the interface ID.

14 Claims, 7 Drawing Sheets

(52) U.S. Cl.
CPC ........ *H04L 61/6004* (2013.01); *H04L 67/025* (2013.01); *H04L 67/12* (2013.01); *H04L 67/2823* (2013.01); *H04L 61/6022* (2013.01); *H04L 61/6059* (2013.01); *Y04S 40/18* (2018.05)

(58) Field of Classification Search
CPC . H04L 67/12; H04L 67/2823; H04L 61/6022; H04L 61/6059; Y04S 40/18

USPC ......................................................... 709/245
See application file for complete search history.

(56) References Cited

U.S. PATENT DOCUMENTS

| | | | |
|---|---|---|---|
| 2015/0382184 A1* | 12/2015 | Takazoe | H04W 8/26 370/475 |
| 2017/0150422 A1* | 5/2017 | Yan | H04L 67/2861 |

FOREIGN PATENT DOCUMENTS

| | | | | |
|---|---|---|---|---|
| JP | 2006319773 A | * | 11/2006 | ............. H04L 12/70 |
| KR | 10-2004-0017566 A | | 2/2004 | |
| KR | 10-2007-0099976 A | | 10/2007 | |
| KR | 10-0960396 B1 | | 5/2010 | |
| KR | 10-2013-0062509 A | | 6/2013 | |

* cited by examiner

ADDRESS GENERATING DEVICE OF REMOTE SMART METER READING SYSTEM, AND METHOD THEREFOR

CROSS REFERENCE

This application is the U.S. National Phase under 35 U.S.C. § 371 of International Application No. PCT/KR2015/010256, filed on Sep. 25, 2015, which claims the benefit of Korean Patent Application No. 10-2015-0078412, filed on Jun. 3, 2015, the entire contents of each are hereby incorporated by reference.

TECHNICAL FIELD

The present invention relates to an address generating device of a remote smart meter reading system, and method therefor. More particularly, the present invention relates to an address generating device of a remote smart meter reading system, and method therefor that generate an IP address and a MAC address based on a meter ID, the top address system, of the remote meter-reading system.

BACKGROUND ART

A smart grid is a next generation electrical grid technology optimizing energy efficiency by integrating information and communications technology with an existing electrical grid and exchanging power generation and consumption information in real time. Generally, the smart grid is separated into a system part related to power information and a network part providing the power information, and a remote smart meter reading system may refer to a representative field. In the remote smart meter reading system, the system part controlling a watt-hour meter realized based on DLMS/COSEM model defined in the international standards IEC 62056-6-1 and IEC 62056-6-2, and the system part for managing remaining parts is realized by each service provider individually. In the network part, different communication technologies can be applied, and currently, commercialization is in realized by applying PLC, ZigBee, WLAN, etc.

For the remote smart meter reading system, a meter ID, an IP address, and a MAC address are required. Since these three types of addresses are individually operated with respective systems in respective layers, there is a problem that complex procedures are required for mapping respective addresses to respective layers and managing them for communication.

Also, in a server that manages power data, a database is required for the meter ID, the IP address or the MAC address. In an IP address-based modem, an IP-MAC matching table is required to be managed by using a protocol such as ARP to obtain the MAC address. These address systems are problematic in that by use thereof, system complexity and resource consumption increase.

In this regard, there is Korean Patent Application Publication No. 2007-0099976, titled "Network management system of AMR with assigned IP address."

DISCLOSURE

Technical Problem

The present invention has been made keeping in mind the above problems occurring in the related art, and the present invention is intended to provide an address generating device of a remote smart meter reading system, and method therefor that generates a EUI-48 bit MAC address based on a meter ID.

Another object of the present invention is to provide an address generating device of a remote smart meter reading system, and method therefor that generates a EUI-64 bit MAC address based on a meter ID.

Another object of the present invention is to provide an address generating device of a remote smart meter reading system, and method therefor that generates an IPv6 address using a meter ID as an interface ID.

Another object of the present invention is to provide an address generating device of a remote smart meter reading system, and method therefor that generates an IPv6 address by using a EUI-64 bit MAC address generated based on a meter ID.

Technical Solution

In order to accomplish the above object, according to an embodiment of the present invention, there is provided an address generating device of a remote smart meter reading system, the device including: a first MAC address generation unit expressing, in four bits, respective numbers that constitute a meter ID of a watt-hour meter, and then converting the numbers into hexadecimal numbers so as to generate a first MAC address of 48 bits; and a first IP address generation unit expressing, in four bits, the respective numbers that constitute the meter ID of the watt-hour meter, and then converting the numbers into the hexadecimal numbers and adding bits to the hexadecimal numbers so as to generate a first IP address of 64 bits being used as an interface ID of IPv6.

Also, the first MAC address generation unit may map, in a EUI-48 (48-bit Extended Unique Identifier) MAC address format, 44 bits that are generated by expressing, in four bits, the numbers of the meter ID and converting the numbers into the hexadecimal numbers.

Also, the first MAC address generation unit may add four bits after first four bits, and then may leave the four bits corresponding to seventh and eighth bits of a EUI-48 MAC blank, and may perform mapping in order.

Also, the first MAC address generation unit may set, among the four bits that are left blank for address conflict and extension, fifth and sixth bits of the EUI-48 MAC to preset values so as to change the first MAC address.

Also, the first IP address generation unit may add 20 bits before 44 bits that are generated by expressing, in four bits, the numbers of the meter ID and converting the numbers into the hexadecimal numbers so as to generate 64 bits equal to the interface ID of IPv6.

Also, the first IP address generation unit may map the generated 64 bits in an address format of IPv6 by using the generated 64 bits as the interface ID.

Also, the device may further include a second MAC address generation unit mapping, in a EUI-64 (64-bit Extended Unique Identifier) MAC address format, 64 bits that are generated by adding 16 bits to a middle of the first MAC address so as to generate a second MAC address.

Also, the second MAC address generation unit may change the second MAC address by changing a seventh local bit into a universal bit.

Also, the device may further include a second IP address generation unit mapping the second MAC address in an address format of IPv6 by using the second MAC address as an interface ID so as to generate a second IP address.

Also, the device may further include an address providing unit providing, to a server manager, address information of the watt-hour meter including at least one of the first MAC address, a second MAC address, the first IP address, and a second IP address that are generated in response to a request of the server manager.

In order to accomplish the above object, according to an embodiment of the present invention, there is provided a method for generating an address of a remote smart meter reading system, the method including: expressing, by a first MAC address generation unit, in four bits, respective numbers that constitute a meter ID of a watt-hour meter, and then converting the numbers into hexadecimal numbers so as to generate a first MAC address of 48 bits; and expressing, by a first IP address generation unit, in four bits, the respective numbers that constitute the meter ID of the watt-hour meter, and then converting the numbers into the hexadecimal numbers and adding bits to the hexadecimal numbers so as to generate a first IP address of 64 bits being used as an interface ID of IPv6.

Also, at the expressing of, in four bits, the respective numbers that constitute the meter ID, and then converting the numbers into the hexadecimal numbers so as to generate the first MAC address of 48 bits, 44 bits that are generated by expressing, in four bits, the numbers of the meter ID and converting the numbers into the hexadecimal numbers may be mapped in a EUI-48 (48-bit Extended Unique Identifier) MAC address format.

Also, at the expressing of, in four bits, the respective numbers that constitute the meter ID, and then converting the numbers into the hexadecimal numbers so as to generate the first MAC address of 48 bits, four bits may be added after first four bits, and then the four bits corresponding to seventh and eighth bits of a EUI-48 MAC are left blank, and mapping is performed in order, and among the four bits that are left blank for address conflict and extension, fifth and sixth bits of the EUI-48 MAC may be set to preset values so as to change the first MAC address.

Also, at the expressing of, in four bits, the respective numbers that constitute the meter ID of the watt-hour meter, and then converting the numbers into the hexadecimal numbers and adding bits to the hexadecimal numbers so as to generate the first IP address of 64 bits being used as the interface ID of IPv6, 20 bits may be added before 44 bits that are generated by expressing, in four bits, the numbers of the meter ID and converting the numbers into the hexadecimal numbers so as to generate the 64 bits equal to the interface ID, and the generated 64 bits may be mapped in an address format of IPv6 by using the generated 64 bits as the interface ID.

Also, after the expressing of, in four bits, the respective numbers that constitute the meter ID, and then converting the numbers into the hexadecimal numbers so as to generate the first MAC address of 48 bits, the method may further include: mapping, in a EUI-64 (64-bit Extended Unique Identifier) MAC address format, 64 bits that are generated by adding 16 bits to a middle of the first MAC address so as to generate a second MAC address; and changing the second MAC address by changing a seventh local bit into a universal bit.

Also, after the mapping, in the EUI-64 (64-bit Extended Unique Identifier) MAC address format, of the 64 bits that are generated by adding 16 bits to the middle of the first MAC address so as to generate the second MAC address, the second MAC address may be mapped in an address format of IPv6 by using the second MAC address as the interface ID.

Also, after generating a second IP address using a second MAC address as the interface ID of IPv6, the method may further include: providing, to a server manager, address information of the watt-hour meter including at least one of the first MAC address, the second MAC address, the first IP address, and the second IP address that are generated in response to a request of the server manager.

Advantageous Effects

According to the address generating device of a remote smart meter reading system, and method therefor, the MAC address and the IPv6 address are generated based on the meter ID, and thus the server manager can easily identify, by using only the meter ID, the remaining addresses, whereby required information can be easily obtained by accessing the watt-hour meter.

Accordingly, the present invention generates addresses conforming to the international standard based MAC address system and the IPv6 address system, whereby an Internet of Thing (IoT) based remote smart meter reading system easily accessing to each watt-hour meter can be constructed and operated.

BEST MODE

Figure 1:
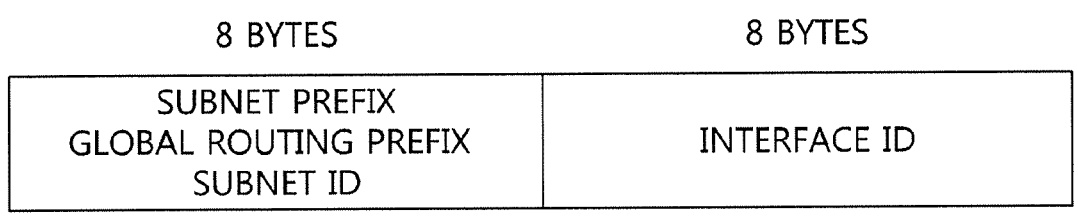
FIG. 1 is a view illustrating a general global unicast address of IPv6.

The present invention will be described in detail below with reference to the accompanying drawings. Repeated descriptions and descriptions of known functions and configurations which have been deemed to obfuscate the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Figure 2:
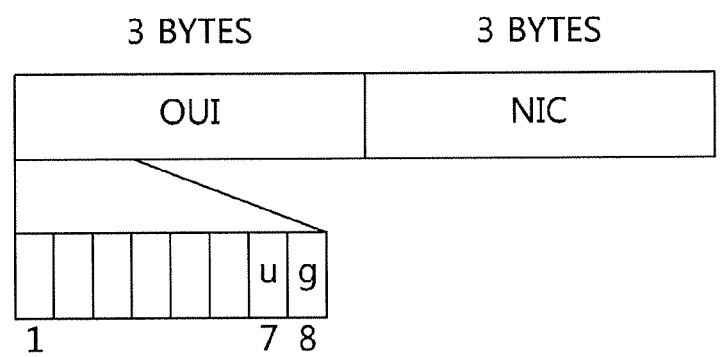
FIG. 2 is a view illustrating EUI-48, which is a 6-byte address system.

FIG. 1 is a view illustrating a general global unicast address of IPv6, FIG. 2 is a view illustrating EUI-48, which is a 6-byte address system.

Fundamentally, a remote smart meter reading system is configured by using a meter ID, an IP address, and a MAC address.

The meter ID means a unique number assigned to each watt-hour meter, and is managed by Korea Electric Power Corporation as an 11-digit number. The IP address means an address used in the network layer, and has a 4-byte size for IPv4, and has a 16-byte size for IPv6. The MAC address means an address of a modem used in the data link layer, and generally uses EUI-48 bit, a more detailed description of which follows.

First, the meter ID is distinguished by assigning a unique 11-digit ID to each watt-hour meter. The meter ID is composed based on the following information.

TABLE 1

| Manufacturer | Form number | Serial number |
| --- | --- | --- |
| Two digits<br>Ex) 37 | Two digits<br>Ex) 25 | Seven digits<br>Ex) 0000089 |

Two digits mean a manufacturer as a number from 01 to 95.

The form number has four values, 25, 45, 26, and 46 depending on instrument type and capacity, and voltages.

The seven-digit serial number is a serial number from 0000001 to 9999999. Actually, a remote meter-reading system of Korea Electric Power Corporation distinguishes and manages each watt-hour meter through the meter ID.

Next, the IP address is a basic address system that realizes the internet, and is a general address technology that is used in a network based on an ISO communication model.

In a conventional remote meter-reading system, IP is used only for a data transmission device. However, in the remote smart meter reading system, an IP address is used for a watt-hour meter, or a modem connected to a watt-hour meter. In order to assign IP addresses to millions of watt-hour meters installed all over the country, IPv6 technology with an almost infinite number of addresses is required. IPv6 is composed in 16 bytes, and a general global unicast address is composed as shown in FIG. 1.

Referring to FIG. 1, the 8-byte subnet prefix at the front is composed of a Global routing prefix used for actual routing and a subnet ID distinguishing a link in a site. The remaining 8 bytes at the back indicates an interface ID that is an ID in a subnet, and generally, the ID is freely assigned without duplication.

The MAC address used at the data link layer is assigned to each communication modem. The commonly used Ethernet uses a EUI-48 system. Recently, although extended EUI-64 [7] technology has been developed, EUI-48 technology is still in use. Depending on a situation, the EUI-48 address system may be used by being converted into EUI-64 format. EUI-48 is a 6-byte address system, and is composed as shown in FIG. 2.

Referring to FIG. 2, the 3 bytes at the front is an Organizationally Unique Identifier (OUI) that means a manufacturer, and the 3 bytes at the back is a Network interface Controller (NIC) that means an ID assigned from a manufacturer. The seventh and eights bits of the OUI have special meanings. When the seventh bit, which is u, is one, it means a universal bit that is globally not overlapped, and when the seventh bit is zero, it means a local bit used only in the subnet. The eighth bit, which is g, distinguishes an individual and a group, and generally, the eighth bit is used as an individual with zero. Except the two bits, the remaining 22-bit section is used to distinguish each manufacturer.

Figure 3:
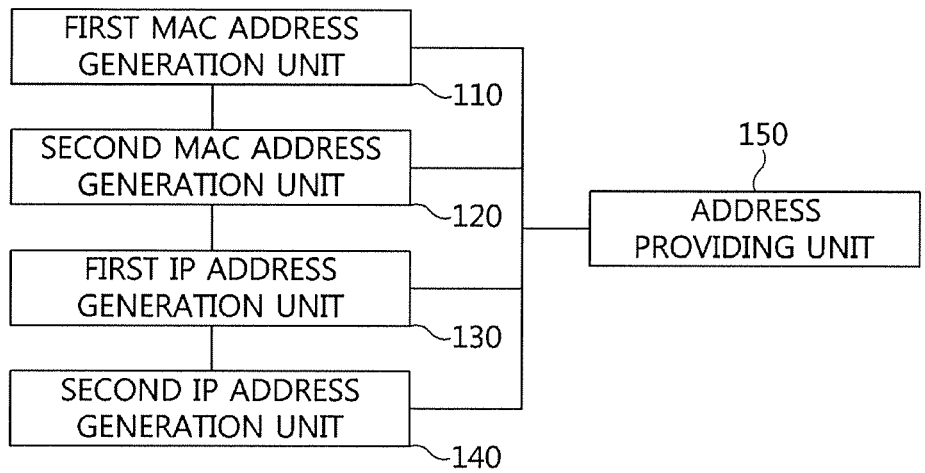
FIG. 3 is a view illustrating configuration of an address generating device of a remote smart meter reading system of according to the present invention.

FIG. 3 is a view illustrating configuration of an address generating device of a remote smart meter reading system of according to the present invention.

Referring to FIG. 3, the address generating device 100, provided in a server reading a watt-hour meter, of the remote smart meter reading system according to the present invention includes: a first MAC address generation unit 110, a second MAC address generation unit 120, a first IP address generation unit 130, a second IP address generation unit 140, and an address providing unit 150.

The first MAC address generation unit 110 expresses respective numbers of the meter ID of the watt-hour meter in four bits, and converts the numbers into hexadecimal numbers such that a first MAC address of 48 bits is generated.

The first MAC address generation unit 110 expresses numbers of the meter ID in four bits, converts the numbers into hexadecimal numbers of 44 bits, and maps the 44 bits in EUI-48 (48 bit Extended Unique Identifier) MAC address format.

Also, the first MAC address generation unit 110 adds four bits after the first four bits 4, and next, four bits corresponding to the seventh and the eighth bits of the EUI-48 MAC are left blank and mapping is performed in order.

The first MAC address generation unit 110 sets, among four bits that are left blank for address conflict and extension, the fifth and the sixth bits of the EUI-48 MAC to preset values so as to change the first MAC address.

The second MAC address generation unit 120 generates a second MAC address of 64 bits by adding bits to the first MAC address.

The second MAC address generation unit 120 maps, in EUI-64 (64 bit Extended Unique Identifier) MAC address format, the 64 bits generated by adding 16 bits to the middle of the first MAC address.

The second MAC address generation unit 120 changes the second MAC address by changing the seventh local bit to a universal bit.

The first IP address generation unit 130 expresses the respective numbers of the meter ID of the watt-hour meter in four bits, converts the numbers into hexadecimal numbers, and generates a first IP address that uses the numbers of 64 bits generated by adding bits as an interface ID of IPv6.

The first IP address generation unit 130 expresses numbers of the meter ID in four bits, converts the numbers into hexadecimal numbers of 44 bits, and generates the same 64 bits as the interface ID by adding 20 bits before the 44 bits.

The first IP address generation unit 130 maps the generated 64 bits in an address format of IPv6 by being used as the interface ID.

The second IP address generation unit 140 generates a second IP address that uses the second MAC address as the interface ID of IPv6.

The second IP address generation unit 140 maps the second MAC address of 64 bits in an address format of IPv6 by being used as the interface ID.

The address providing unit 150 provides, to the server manager, address information of the watt-hour meter including at least one of the first MAC address, the second MAC address, the first IP address, and the second IP address that are generated in response to the request of the sever manager.

Figure 4:
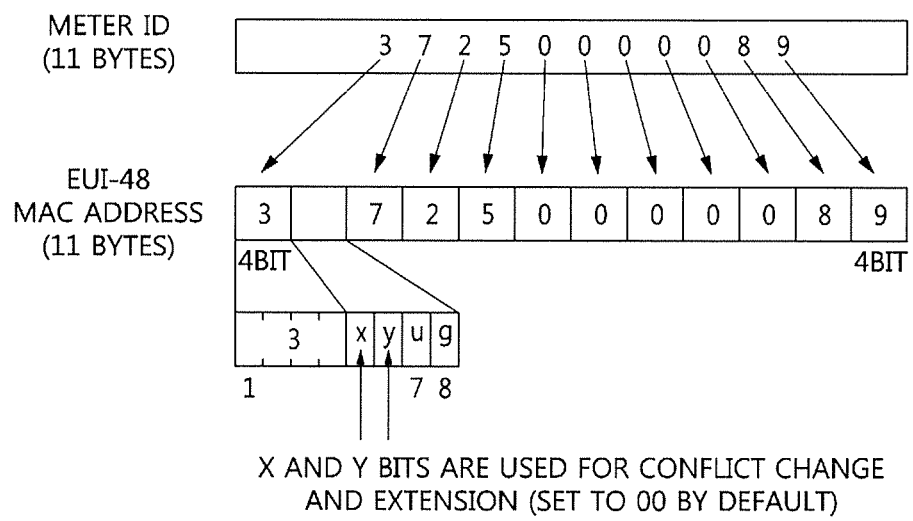
FIGS. 4 to 6 are views illustrating a method of generating a first MAC address according to the present invention.
Figure 5:
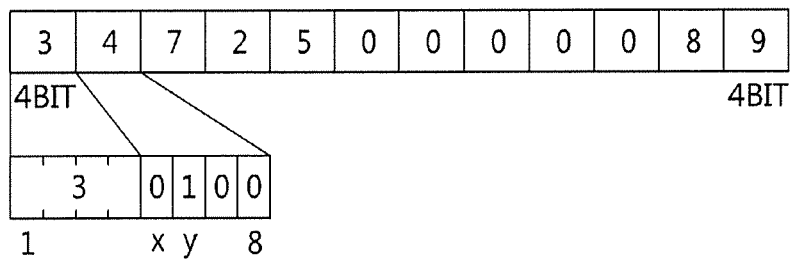
Figure 6:
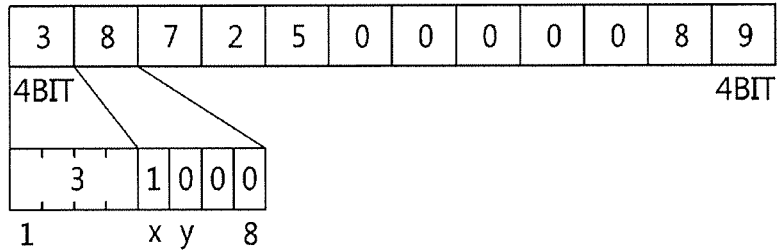

FIGS. 4 to 6 are views illustrating a method of generating a first MAC address according to the present invention.

Referring to FIG. 4, the method of generating the first MAC address according to the present invention uses the first MAC address generation unit of the address generating device 100 of the remote smart meter reading system.

The meter ID of the watt-hour meter is composed as an 11-digit number, and the number of each digit is expressed in four bits to be converted into 44 bits. For example, when there is a watt-hour meter with a meter ID of 37250000089, each number of the meter ID is expressed in four bits and is converted into hexadecimal numbers, thereby being 0x3, 0x72, 0x50, 0x00, 0x00, and 0x89. The converted hexadecimal numbers are 44 bits, and thus that can be mapped to EUI-48 bit MAC address format. However, the seventh and eight bits of the EUI-48 bit OUI have special meanings. Thus, as shown in FIG. 4, the first number is placed in the first four bits, the subsequent four bits are left blank for u and g bits setting, and then are mapped in order.

Generally, the MAC address is individually used in one subnet, and thus u and g bits are respectively set to zero. That is, when the 11-byte meter ID is 37250000089, the 6-byte MAC address of 0x307250000089 (OUI portion: 0x307250, NIC portion: 0x000089) can be formed. The converted address maintains u and g bits setting of the EUI-48 bit system regardless of meter ID information, and thus, the converted address can communicate with conventional communication technologies such as Ethernet, etc. without any problems.

When a watt-hour meter or another system to which the present invention is not applied is connected to a local network, a conflict problem of the MAC address may occur. When receiving a request for MAC address change from the watt-hour meter due to conflict, its own MAC address change is refused and the MAC address of the other modem that causes conflict is induced to change, if possible. However, when it is necessary to change its own MAC address, the x and y bits that are left for conflict and extension are used.

More specifically, when receiving a request for a compulsory first change of the MAC address due to the conflict, as shown in FIG. 5, the x and y bits are set to 01 such that its own MAC address is changed. In this case, the MAC address is changed into 0x347250000089, but the EUI-48 bit portion (34X250000089) with the meter ID information is not modified yet, and thus there is no influence on the address system. Since a portion having the x and y bits is not the NIC portion that is an ID assigned to each modem but the OUI (existing 0x307250 OUI changed to 0x347250 OUI) portion that distinguishes the manufacturer, the changed MAC address is unlikely re-conflicted. However, when receiving a request for a compulsory second change due to re-conflict, as shown in FIG. 6, the x and y bits are set to 10 such that its own MAC address may be changed again.

Cases depending on x and y bits setting follows.

TABLE 2

| X bit value | Y bit value | Meaning |
| --- | --- | --- |
| 0 | 0 | Basic MAC address |
| 0 | 1 | In conflict, the first change |
| 1 | 0 | In conflict, the second change |
| 1 | 1 | Used for manufacturer extension |

Figure 7:
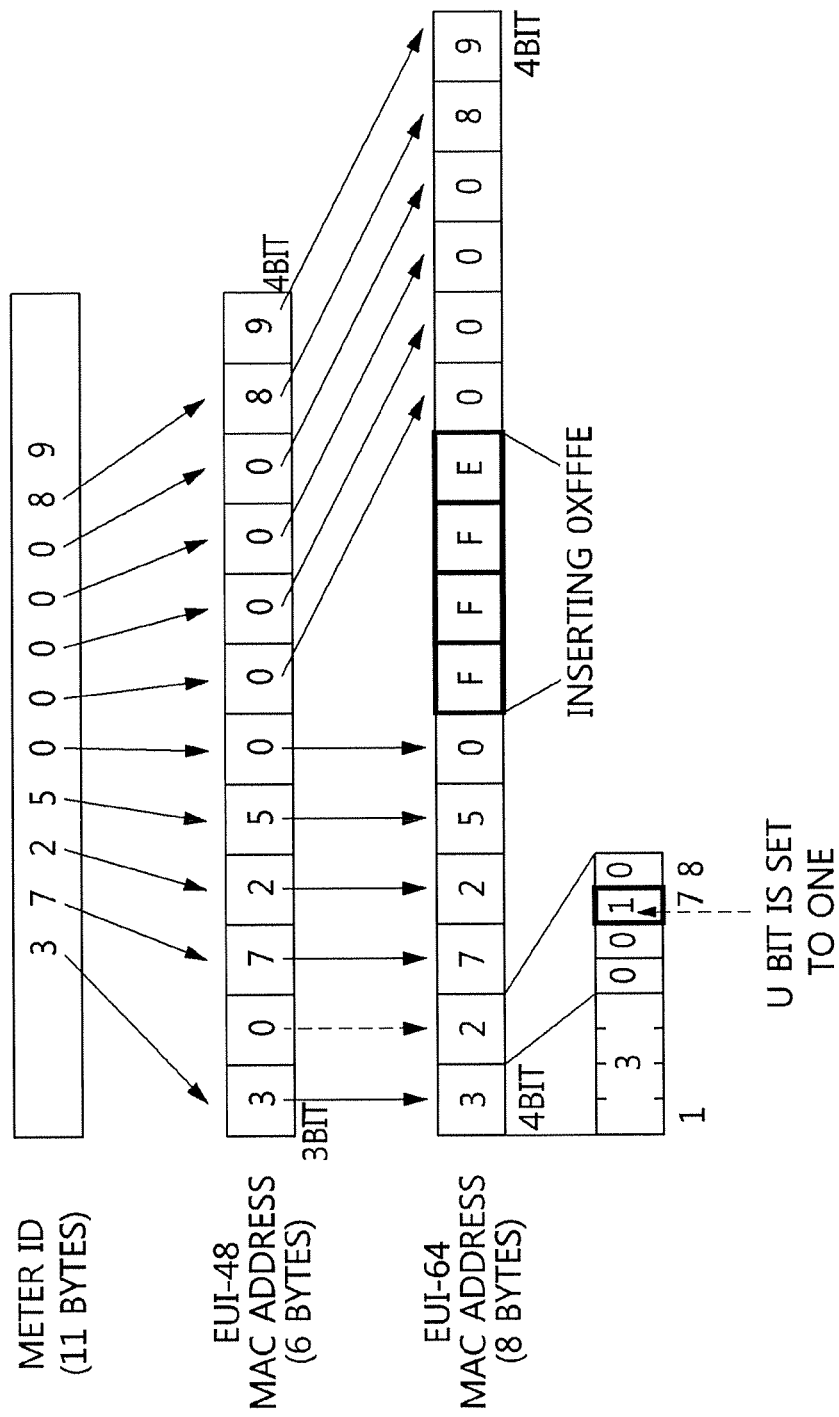
FIG. 7 is a view illustrating a method of generating a second MAC address according to the present invention.

FIG. 7 is a view illustrating a method of generating a second MAC address according to the present invention.

Referring to FIG. 7, the method of generating the second MAC address according to the present invention uses the second MAC address generation unit of the address generating device 100 of the remote smart meter reading system.

When a communication method used in a local network is based on an IEEE EUI-64 address system, it is required to form a EUI-64 bit MAC address based on the meter ID of the watt-hour meter. RFC2464 proposes a method of converting an existing EUI-48 bit address system into a EUI-64 bit address system. Accordingly, in the present invention, when it is required to generate the EUI-64 bit MAC address, the EUI-48 bit MAC address based on the meter ID is converted into the EUI-64 bit MAC address according to RFC2464. The conversion method is that 0xFFFE (16 bits) value is inserted into the middle of the existing EUI-48 bit MAC address to increase the bit size to 64 bits and the u bit is changed from local to universal. For example, when the meter ID is 37250000089, based on this address, a EUI-48 bit MAC address of 0x307250000089 is generated through the above-described method, and this value is changed to a EUI-64 bit MAC address to finally generate the EUI-64 bit MAC address of 0x327250FFFE000089.

Here, since the u bit is changed to one, 0x30 that is the first byte value of the EUI-48 bit address is changed to 0x32 in the EUI-64 bit address. The x and y bits used in the EUI-48 bit address can be equally used in the EUI-64 bit address depending on conflict condition. Through these processes, the EUI-48 bit MAC address and the EUI-64 bit MAC address that does not violate international standards can be formed based on the meter ID.

Figure 8:
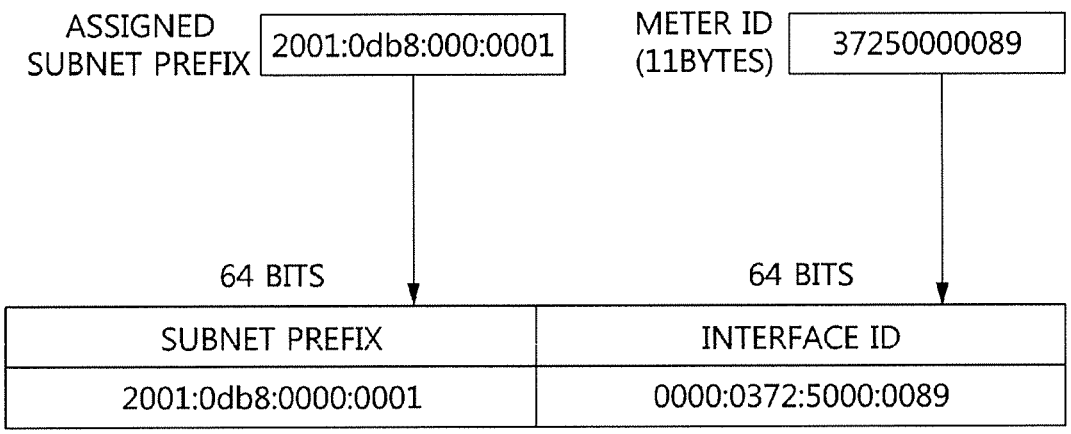
FIG. 8 is a view illustrating a method of generating a first IP address according to the present invention.

FIG. 8 is a view illustrating a method of generating a first IP address according to the present invention.

Referring to FIG. 8, the method of generating the first IP address according to the present invention uses the first IP address generation unit of the address generating device 100 of the remote smart meter reading system.

The 16-byte address system of IPv6 is divided into an 8-byte subnet prefix at the front and an 8-byte interface ID at the back. Subnet prefixes composed of an actual hierarchical address system are divided by ISPs into countries and organizations, and are assigned to institutions and organizations according to domestic policy. That is, in terms of one remote meter-reading network, the subnet prefix of IPv6 is fixed like a pre-determined promise, and different interface IDs are assigned to meters. Accordingly, the present invention proposes, as a first method related to an IP, a method for directly setting an interface ID by using a meter ID.

When respective numbers of the meter ID of 11 bytes of the watt-hour meter is converted into hexadecimal numbers by being expressed in four bits, 44 bits are generated. When adding zero of 20 bits before the generated 44-bit value, a 64-bit number the same as the interface ID is generated. As described above, the generated 64-bit number is used as the interface ID of actual IPv6.

For example, it is assumed that the subnet prefix of the network is 2001:0db8:0000:0001 and the meter ID is 37250000089. When expressing the meter ID in hexadecimal numbers, the meter ID is 0x37250000089. When adding zero of 20 bits before the value, 0x0000037250000089 is obtained. When expressing the converted 64-bit value in IPv6 notation, it is 0000:0372:50000:0089. When the value is used as the interface ID to complete an actual IPv6 address format, as shown in the drawing, an address of 2001:0db8:0000:0001:0000:0372:50000:0089 may be generated. Since the address includes meter ID information, it is convenient for users or server managers.

Figure 9:
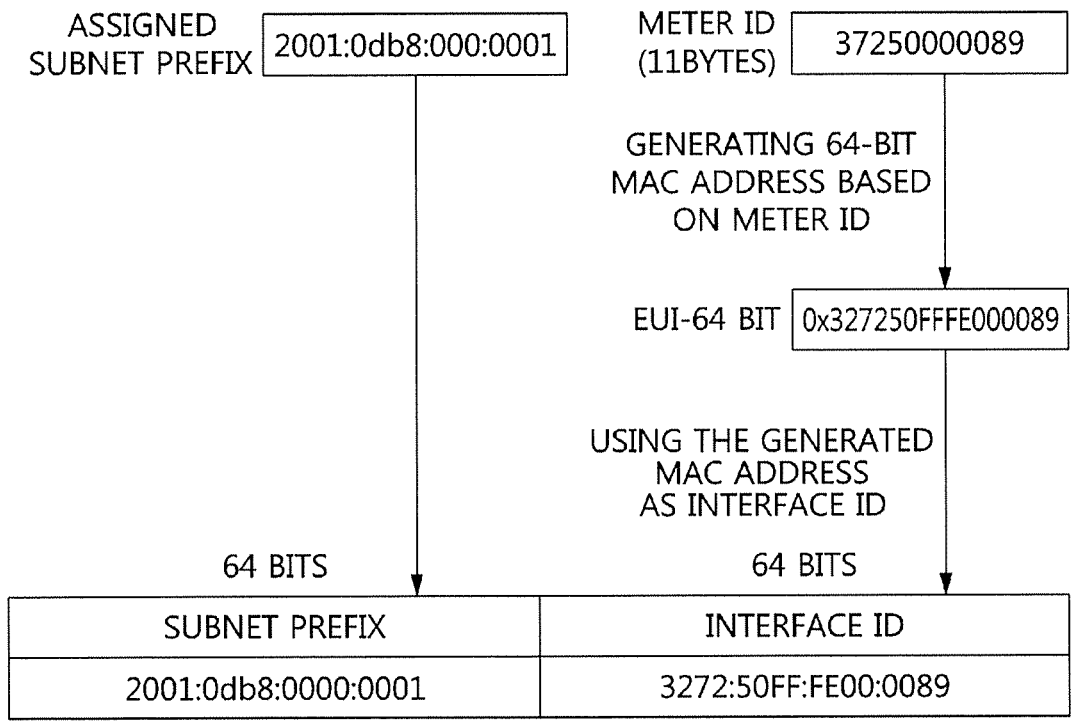
FIG. 9 is a view illustrating a method of generating a second IP address according to the present invention.

FIG. 9 is a view illustrating a method of generating a second IP address according to the present invention.

Referring to FIG. 9, the method of generating the second IP address according to the present invention uses the second IP address generation unit of the address generating device 100 of the remote smart meter reading system.

IPv6 autonomously supports a process of obtaining a MAC address through Neighbor Discovery Protocol.

However, when the interface ID is set to the EUI-64 bit address based on the meter ID, a MAC address can be also known though an IP address, and thus it can be used in a gateway to which the present invention is not applied.

For example, it is assumed that a subnet prefix of a network is 2001:0db8:0000:0001 and the meter ID is 37250000089. By using the meter ID, when generating the EUI-64 bit MAC address of 0x327250FFFE000089 and using the address as the interface ID of IPv6, an IPv6 address of 2001:0db8:0000:0001:3272:50FF:FE00:0089 including both the meter ID and MAC address information can be generated.

Figure 10:
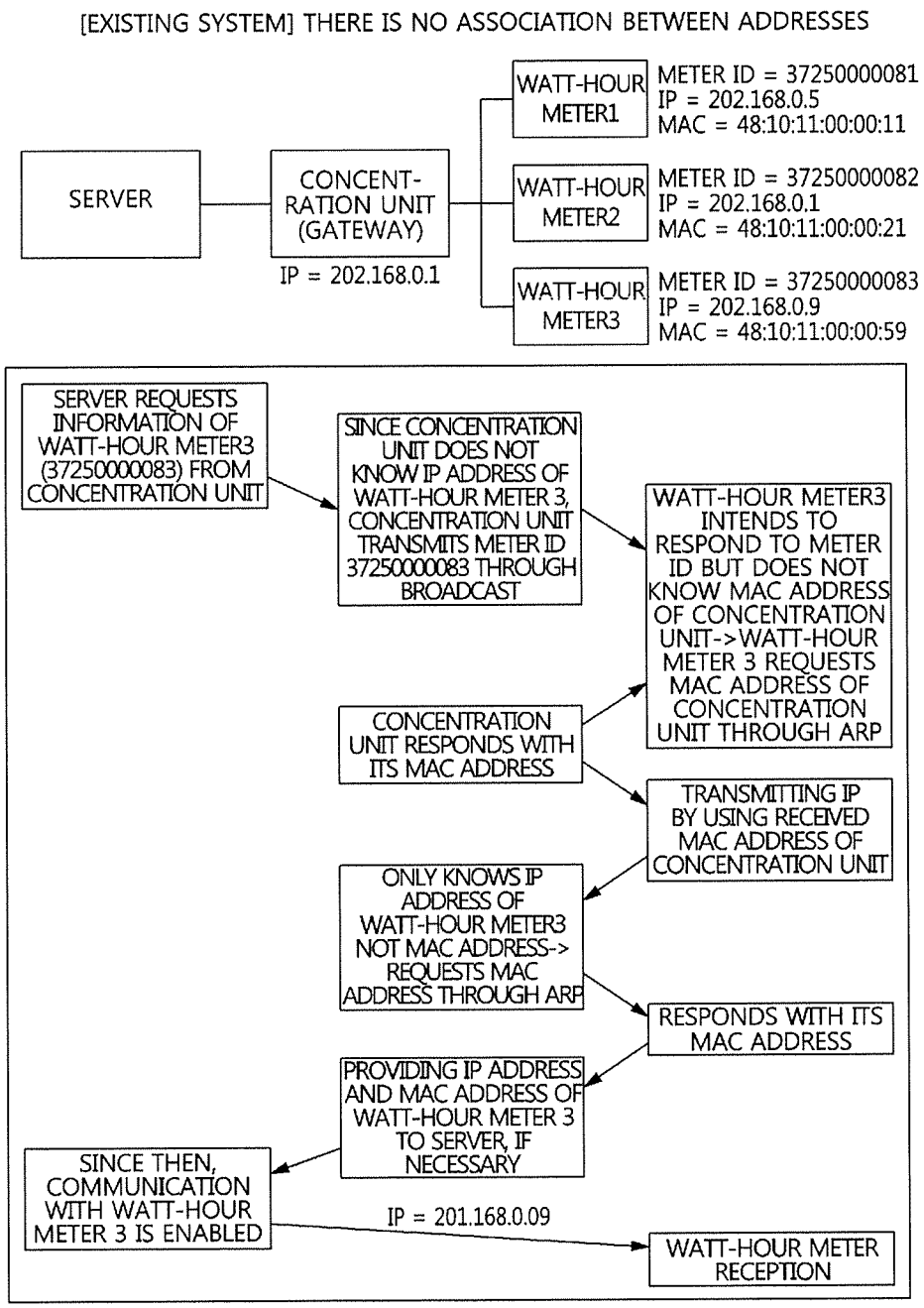
FIG. 10 is a view illustrating a conventional process of managing an address of a watt-hour meter.
Figure 11:
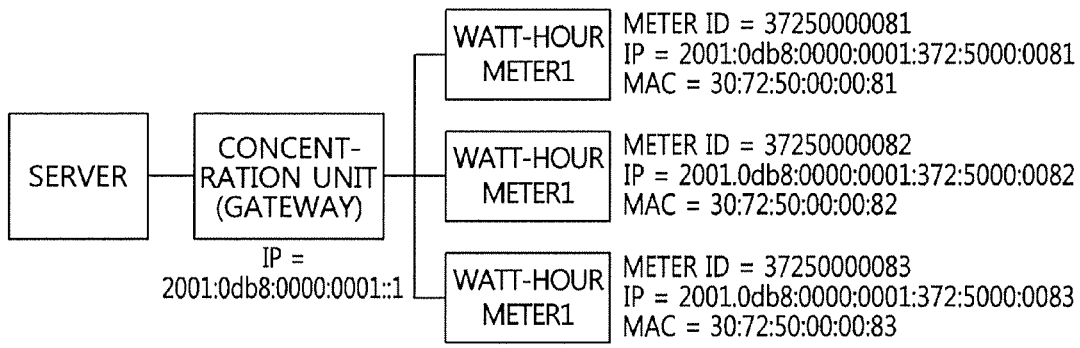
FIG. 11 is a view illustrating a process of managing an address of a watt-hour meter according to the present invention.
Figure 11:
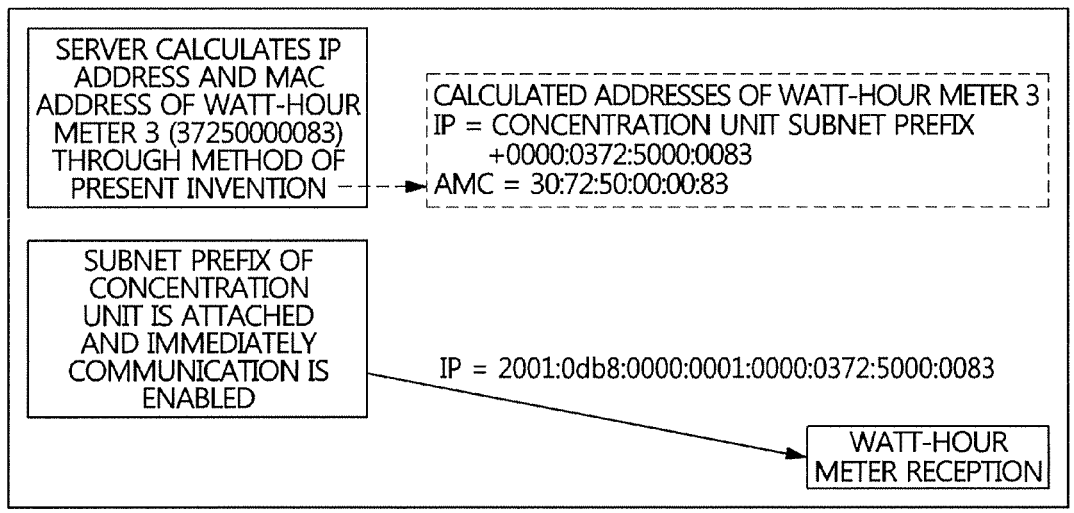

FIG. 10 is a view illustrating a conventional process of managing an address of a watt-hour meter, FIG. 11 is a view illustrating a process of managing an address of a watt-hour meter according to the present invention.

Referring to FIG. 10, heretofore, first, the server requests information of a watt-hour meter 3 from a data concentration unit.

Next, since the data concentration unit does not know an IP address of the watt-hour meter 3, the data concentration unit transmits a meter ID through broadcast.

Next, the watt-hour meter 3 intends to respond to the meter ID but does not know a MAC address of the data concentration unit, and thus the watt-hour meter 3 requests the MAC address of the data concentration unit through ARP.

Next, the data concentration unit transmits the MAC address thereof to the watt-hour meter 3.

Next, the watt-hour meter 3 transmits the IP address thereof by using the received MAC address. The conventional process is complex.

However, referring to FIG. 11, in the present invention, first, the server calculates an IP address and a MAC address of the watt-hour meter 3 by using the address generating device of the remote smart meter reading system, and then attaches a subnet prefix of the data concentration unit, whereby communication with the watt-hour meter is immediately enabled.

As described above, the address generating device of a remote smart meter reading system, and method therefor according to the present invention generate the MAC address and the IPv6 address based on the meter ID, and thus the server manager can easily identify, by using only the meter ID, the remaining addresses, whereby required information can be easily obtained by accessing the watt-hour meter.

Although the preferred embodiments of the present invention have been disclosed for illustrative purposes, those skilled in the art will appreciate that various modifications and changes are possible, without departing from the scope and spirit of the present invention as disclosed in the accompanying claims.

The invention claimed is:

1. An address generating device of a remote smart meter reading system, the device comprising:
    a first MAC address generation unit expressing, in four bits, respective numbers that constitute a meter ID of a watt-hour meter, and then converting the numbers into hexadecimal numbers so as to generate a first MAC address of 48 bits; and
    a first IP address generation unit expressing, in four bits, the respective numbers that constitute the meter ID of the watt-hour meter, and then converting the numbers into the hexadecimal numbers and adding bits to the hexadecimal numbers so as to generate a first IP address of 64 bits,
    wherein the meter ID includes a manufacturer, a form number and a serial number of the watt-hour meter,
    wherein the first MAC address generation unit maps, in a EUI-48 (48-bit Extended Unique Identifier) MAC address format, 44 bits that are generated by expressing, in four bits, the numbers of the meter ID and converting the numberes into the hexadecimal numbers,
    wherein the first MAC address generation unit adds four bits after a first four bits, and then leaves the four bits corresponding to seventh and eighth bits of a EUI-48 MAC blank, and performs mapping in order, and
    wherein the first MAC address generation unit includes the manufacturer and the form number of the meter ID in OUI (Organizationally Unique Identifiers) of the first MAC address.

2. The device of claim 1, wherein the first MAC address generation unit sets, among the four bits that are left blank for address conflict and extension, fifth and sixth bits of the EUI-48 MAC to preset values so as to change the first MAC address.

3. The device of claim 1, wherein the first IP address generation unit adds 20 bits before 44 bits that are generated by expressing, in four bits, the numbers of the meter ID and converting the numbers into the hexadecimal numbers so as to generate 64 bits equal to an interface ID of IPv6.

4. The device of claim 3, wherein the first IP address generation unit maps the generated 64 bits in an address format of IPv6 by using the generated 64 bits as the interface ID.

5. The device of claim 1, further comprising:
    a second MAC address generation unit mapping, in a EUI-64 (64-bit Extended Unique Identifier) MAC address format, 64 bits that are generated by adding 16 bits to a middle of the first MAC address so as to generate a second MAC address.

6. The device of claim 5, wherein the second MAC address generation unit changes the second MAC address by changing a seventh local bit into a universal bit.

7. The device of claim 5, further comprising:
    a second IP address generation unit mapping the second MAC address in an address format of IPv6 by using the second MAC address as an interface ID so as to generate a second IP address.

8. The device of claim 1, further comprising:
    an address providing unit providing, to a server manager, address information of the watt-hour meter including at least one of the first MAC address, a second MAC address, the first IP address, and a second IP address that are generated in response to a request of the server manager.

9. A method for generating an address of a remote smart meter reading system, the method comprising:
    expressing, by a first MAC address generation unit, in four bits, respective numbers that constitute a meter ID of a watt-hour meter, and then converting the numbers into hexadecimal numbers so as to generate a first MAC address of 48 bits; and
    expressing, by a first IP address generation unit, in four bits, the respective numbers that constitute the meter ID of the watt-hour meter, and then converting the numbers into the hexadecimal numbers and adding bits to the hexadecimal numbers so as to generate a first IP address of 64 bits being used as an interface ID of IPv6,
    wherein the meter ID includes a manufacturer, a form number and a serial number of the watt-hour meter, wherein at the expressing of, in four bits, the respective numbers that constitute the meter ID, and then converting the numbers into the hexadecimal numbers so as to generate the first MAC address of 48 bits, 44 bits that are generated by expressing, in four bits, the numbers of the meter ID an converting the numbers into the hexadecimal numbers are mapped in a EUI-48 (48-bit Extended Unique Identifier) MAC address format, and four bits are added after a first four bits, and then the four bits corresponding to seventh and eighth bits of a EUI-48 MAC are left blank, and mapping is performed in order, and wherein the first MAC address generation unit includes the manufacturer and the form number of the meter ID in OUI (Organizationally Unique Identifiers) of the first MAC address.

10. The method of claim 9, wherein at the expressing of, in four bits, the respective numbers that constitute the meter ID, and then converting the numbers into the hexadecimal numbers so as to generate the first MAC address of 48 bits, and among the four bits that are left blank for address conflict and extension, fifth and sixth bits of the EUI-48 MAC are set to preset values so as to change the first MAC address.

11. The method of claim 9, wherein at the expressing of, in four bits, the respective numbers that constitute the meter ID of the watt-hour meter, and then converting the numbers into the hexadecimal numbers and adding bits to the hexadecimal numbers so as to generate the first IP address of 64 bits being used as the interface ID of IPv6, 20 bits are added before 44 bits that are generated by expressing, in four bits, the numbers of the meter ID and converting the numbers into the hexadecimal numbers so as to generate the 64 bits equal to the interface ID, and the generated 64 bits are mapped in an address format of IPv6 by using the generated 64 bits as the interface ID.

12. The method of claim 9, after the expressing of, in four bits, the respective numbers that constitute the meter ID, and then converting the numbers into the hexadecimal numbers so as to generate the first MAC address of 48 bits, further comprising:

mapping, in a EUI-64 (64-bit Extended Unique Identifier) MAC address format, 64 bits that are generated by adding 16 bits to a middle of the first MAC address so as to generate a second MAC address; and changing the second MAC address by changing a seventh local bit into a universal bit.

13. The method of claim 12, wherein after the mapping, in the EUI-64 (64-bit Extended Unique Identifier) MAC address format, of the 64 bits that are generated by adding 16 bits to the middle of the first MAC address so as to generate the second MAC address, the second MAC address is mapped in an address format of IPv6 by using the second MAC address as the interface ID.

14. The method of claim 12, after generating a second IP address using the second MAC address as the interface ID of IPv6, further comprising:

providing, to a server manager, address information of the watt-hour meter including at least one of the first MAC address, the second MAC address, the first IP address, and the second IP address that are generated in response to a request of the server manager.

* * * * *